United States Patent [19]

Baumann

[11] Patent Number: 5,009,956
[45] Date of Patent: Apr. 23, 1991

[54] PHOSPHOLIPASE A₂-RESISTANT LIPOSOMES

[75] Inventor: Wolfgang J. Baumann, Austin, Minn.

[73] Assignee: Regents of the University of Minnesota, Minneapolis, Minn.

[21] Appl. No.: 333,829

[22] Filed: Mar. 31, 1989

Related U.S. Application Data

[63] Continuation of Ser. No. 17,369, Feb. 24, 1987, abandoned.

[51] Int. Cl.⁵ .................... A61K 9/133; A61K 37/22; B01J 131/04
[52] U.S. Cl. .................... 428/402.2; 264/4.1; 264/4.6; 424/450; 436/829
[58] Field of Search ............. 264/4.1; 428/402.2; 424/450; 436/829

[56]          References Cited
       U.S. PATENT DOCUMENTS

| | | |
|---|---|---|
| Re. 31,609 | 6/1984 | Sears ................... 424/450 |
| 4,235,871 | 11/1980 | Papahadjopoulos et al. ... 428/402.2 X |
| 4,372,949 | 2/1983 | Kodama et al. ............ 424/450 X |
| 4,515,736 | 5/1985 | Deamer ................... 264/4.3 |
| 4,564,599 | 1/1986 | Janoff et al. ............ 428/402.2 X |

OTHER PUBLICATIONS

Van Deenen, 1963, Biochim. Biophys. Acta, 70:538–553.
Klopfenstein et al., 1974, Chem. Phys. Lipids, 13:215–222.
Mandersloot et al., 1975, Biochim. Biophys. Acta, 382:22–26.
De Kruijff et al., 1975, Biochim. Biophys. Acta, 406:6–20.
Lee et al., 1977, Biochemistry, 16 (7):1303–1309.
Harlos et al., 1977, FEBS Letters, 77 (1):7–10.
De Kruyff et al., 1977, Biochim. Biophys. Acta, 465:443–453.
Van Den Besselaar et al., 1977, Biochim. Biophys. Acta, 465:454–465.
Morris et al., 1980, Biochim. Biophys. Acta, 599:380–390.
Van Echteld et al., 1981, Biochim. Biophys. Acta, 649:211–220.
Ostro, 1987, Scientific American, 256 (1):102–111.
Ryman et al., 1980, Essays in Biochemistry, 16:49–98.
Jain et al., 1983, Biochim. Biophys. Acta, 736:157–162.
Tilcock, 1986, Chem. Phys. Lipids, 40:109–125.
Hope et al., 1986, Chem. Phys. Lipids, 40:89–107.
Mayer et al., 1986, Chem. Phys. Lipids, 40:333–345.
International Search Report for International Application No. PCT/US 88/00508.
M.K. Jain et al., *Chemical Abstracts*, 100, no. 13, March 26, 1984.
N. Elise Gabriel et al., *Biochemistry*, 26, no. 23, November 17, 1987.
C. Vigo et al., *Chemical Abstracts*, 93 no. 1, July 7, 1980.
E. Okimasu et al., *Chemical Abstracts*, 97, no. 23, December 6, 1982.
C.M. Gupta et al., *Chemical Abstracts*, 94, no. 19, May 11, 1981.

*Chemical Abstracts*, 107, no. 23, December 7, 1987.
*Primary Examiner*—Richard D. Lovering
*Attorney, Agent, or Firm*—Merchant, Gould, Smith, Edell, Welter & Schmidt

[57]          ABSTRACT

A method to inhibit phospholipase A₂-type hydrolytic degradation of liposome membranes is disclosed comprising forming a liposome having a bilayer membrane comprising (i) between about 67.5–85 mol-% of a phospholipid of the formula:

and (ii) between about 15.0–32.5 mol-% of a lysophospholipid of the formula:

wherein $R_1$, $R_2$ and $R_3$ are individually ($C_{10}$–$C_{30}$) alkanoyl groups including from about 0–4 double bonds.

11 Claims, 4 Drawing Sheets

PHOSPHOLIPASE A₂-RESISTANT LIPOSOMES

This is a continuation of application Ser. No. 07/017,369, filed Feb. 24, 1987, now abandoned.

BACKGROUND OF THE INVENTION

This invention was made with the assistance of National Institutes of Health Grant HL08214. The Government has certain rights in this invention.

Liposomes are fluid-filled vesicles of varying sizes which have phospholipid bilayer membranes. A liposome may have a single bilayer membrane, in which case it is unilamellar, or it may have multiple bilayer membranes, in which case it is multilamellar. In recent years, liposomes have been widely employed for the delivery of cosmetics, diagnostic reagents and bioactive substances such as herbicides, insecticides and therapeutic drugs. Liposomes are of special interest as vehicles for in vivo drug delivery because they can be designed to deliver and release drugs directly into target tissues. Therefore, general systemic drugs delivery can be avoided and the therapeutic ratio of effectiveness over toxicity can be generally increased.

Since their discovery by A. D. Banghan in 1961, liposomes have been loaded with a variety of therapeutic agents. Liposomes are desirable drug delivery vehicles for a number of reasons. The bilayer membrane is generally composed of natural constituents such as phospholipids, which are found in the body, and are nontoxic and nonimmunogenic. Therefore, gaining regulatory approval for their use in human subjects has been far less burdensome than for many other delivery vehicles. In addition, once a liposome has been directed to diseased tissue, it is unique in its ability to absorb onto the cell surface, whereupon it may be endocytosed, or swallowed up. Absorbed liposomes can also fuse with cells, thereby releasing their contents directly into the cell in high concentration.

Therefore, if liposomes retain their integrity, they can be selectively directed to diseased tissues, where they can release drugs directly into diseased cells, thereby obviating the need for general systemic exposure to drugs and their inherent toxic effects. Methods of directing liposomes to diseased tissues are known. For example, tissue-specific monoclonal antibodies can be attached to the liposomes to guide them to target tissues. Although precise delivery techniques are still being perfected, it is likely that new therapies based on such liposome technology will soon be available. A need, however, exists for further development of liposomes which retain their integrity.

The liposomal membrane can be formed when phospholipids such as phosphatidylcholine are dispersed in water. Phospholipids are generally amphiphatic, meaning they have hydrophobic regions, or "tails", and hydrophilic regions, or "heads". Two fatty acid chains generally containing from 10–30 carbon atoms make up the hydrophobic tail of most naturally-occurring phospholipid molecules. Phosphoric acid bound to any of several water soluble molecules compose the hydrophilic head. In the phospholipid bilayer membrane, the hydrophobic fatty acid tails point into the hydrophobic environment of the membrane's interior, and the polar head groups point outward to interact with water on both the inside and the outside of the vesicle.

Although liposomes employed for drug delivery typically range in diameter from 250 Å to several micrometers, small unilamellar vesicles (SUV) in the range of 250–300 Å are particularly desirable for use as drug vehicles because of their size. SUVs appear to exhibit increased partitioning to the bone marrow and also exhibit increased longevity in the circulatory system when delivered intravenously. Smaller vesicles have also been reported to be more effective in subcutaneous injections to deliver drugs to lymph nodes.

However, liposomes, including SUVs, are often unstable during long-term storage and upon infusion into mammalian systems. The reason for the lack of physical stability has not been well understood. With regard to stability within mammalian systems, however, it is known that phospholipids are substrates for enzymes such as phospholipase $A_2$, lecithin-cholesterol acyltransferase (LCAT) and the like, which are found in vivo. Phosphatidylcholine, or lecithin, which is perhaps the most commonly employed phospholipid bilayer constituent, is attacked at the C-2 position by phospholipase $A_2$ which cleaves the acyl group attached to the C-2 carbon of the glycerol moiety. Other enzymes, including LCAT, also catalyze phospholipase $A_2$-type cleavage reactions of a variety of phospholipids. When these enzymes attack the phospholipid constituents of the bilayer membrane in vivo, the liposome membrane is destabilized and its contents will leak out.

Therefore, a need exists for liposomes, especially SUVs, which are physically stable and which resist phospholipase $A_2$-type cleavage. An additional need exits for a method to physically stabilize and to prevent the hydrolytic degradation of liposomal phospholipid bilayers by phospholipase $A_2$-type cleavage.

SUMMARY OF THE INVENTION

The present invention provides a method to inhibit the phospholipase $A_2$-type cleave of a liposome membrane comprising: forming a liposome having a bilayer membrane comprising (i) between about 67.5–85 mol-% of a phospholipid of the formula (I):

and (ii) between about 15–32.5 mol-% of a lysophospholipid of the formula (II):

wherein, in formulas I and II, $R_1$, $R_2$ and $R_3$ are individually ($C_{10}$–$C_{30}$) alkanoyloxy groups including from 0–4 double bonds, and preferably are individually ($C_{12}$–$C_{22}$)-n-alkanoyloxy groups, including 0–1 double bonds. Preferably $R_1$ is identical to $R_3$.

For example, in one embodiment of the invention, the phospholipase $A_2$ (PLA$_2$) hydrolysis of small unilamellar vesicle (SUV) liposomes having membranes comprising a mixture of 1-palmitoyl-2-oleoyl-sn-glycero-3-phosphocholine (POPC) and about 20–30 mol-% 1-palmitoyl-sn-glycero-3-phosphocholine (lysoPC) was completely inhibited.

In liposomes containing phospholipid (I) and lysophospholipid (II), the initial rate of PLA$_2$ hydrolysis of phospholipid I correlates with the ratio of lysophospholipid (II) to phospholipid (I) in the outer layer of the bilayer membrane. The PLA$_2$ hydrolysis of the phospholipid I in the liposome membrane is substantially inhibited when the outside lysophospholipid (II)-to-phospholipid (I) ratio reaches about 0.275-0.35, preferably about 0.3-0.325. The ratio of phospholipid I to lysophospholipid II in the bilayer membrane is preferably about 3-4:1.

The present method is particularly useful for the stabilization of liposomes which are preferably prepared by the sonication of aqueous dispersions of a mixture of the membrane components of formula I and II to equilibrium, e.g., for about 20 min. to 2.0 hours under the conditions set forth herein below in part B of the Example. These liposomes typically are unilamellar spherules having an outside diameter of about 250-300 Å and a membrane thickness of about 35-45 Å. It was also found that phospholipase A$_2$ hydrolysis of these membranes is stimulated by lysophospholipid II at concentrations of up to 12.5 mol-%.

The present invention also provides a method of stabilizing a liposome membrane comprising forming a liposome having a bilayer membrane having an outer layer and an inner layer comprising:

(a) between about 67.5-85 mol-% of a phospholipid (PL) of the formula:

; and

(b) between about 15-32.5 mol-% of a lysophospholipid (LPL) of the formula:

wherein $R_1$, $R_2$ and $R_3$ are individually ($C_{10}$-$C_{30}$) alkanoyloxy groups including from about 0-4 double bonds; by sonicating a mixture of (a) and (b) in water for a period of time effective to equilibrate (a) and (b) in the bilayer membrane so that the ratio of LPL to PL in the outer layer is about 0.275-0.35:1, and optimal stability is achieved.

In a preferred embodiment of the present method, the ratio of PL to LPL in the bilayer membrane is about 3-4:1. Preferably, the membrane includes about 20-30 mol-% of the LPL, and most preferably the ratio of LPL to PL in the outer layer is about 0.3-0.325:1.0.

Therefore, the present invention also is directed to a liposome comprising a bilayer membrane having an outer layer and an inner layer, wherein said liposome has an outer diameter of about 250-300 Å, wherein said bilayer membrane has a thickness of about 35-45 Å, wherein said membrane comprises (i) between about 67.5-85 mol-% of a phospholipid of the formula:

and (ii) between about 15-32.5 mol-% of a lysophospholipid of the formula:

wherein $R_1$, $R_2$ and $R_3$ are individually ($C_{10}$-$C_{30}$) alkanoyloxy groups including from about 0-4 double bonds; and wherein said membrane is resistant to phospholipase A$_2$ hydrolysis.

As used herein, the terms "resistant" to phospholipase A$_2$ (PLA$_2$) or A$_2$-type cleavage or hydrolysis, or to "inhibit" said cleavage or hydrolysis, indicates that the membrane phospholipid (I) is not hydrolyzed, and the present membranes retain essentially all of their contents under the assay conditions described hereinbelow. For example, liposomal membranes initially containing 2.5 mol-% of a lysophospholipid of formula II became leaky after one hour of phospholipase A$_2$ hydrolysis. In contrast, in liposomal membranes containing 20-25 mol-% of a lysophospholipid of formula II, PLA$_2$ hydrolysis of the phospholipid matrix was completely inhibited as determined by $^{31}$P-NMR. These liposomes maintained an intact ion barrier for at least four days.

As used herein, the term "phospholipase A$_2$-type hydroylsis or cleavage" refers to cleavage to the C$_2$-ester linkage of a membrane phospholipid of formula I at the glycerol moiety. This cleavage can be accomplished in vivo or in vitro by various enzymes of the phospholipase A$_2$-type or by lecithin-cholesterol acyltransferase (LCAT), and other esterases.

Although cholesterol and cholesterol derivatives have previously been employed to stabilize liposomes, the present invention represents an improvement over that technique in that (a) substantially greater stabilization can be achieved over that possible using cholesterol; and (b) in the case of the administration of the liposomes to a human, the potentially deleterious effects of large amounts of cholesterol are avoided. The liposome membranes exemplified herein are essentially cholesterol-free. However, small amounts of up to about 5 mol-%, preferably up to about 2 mol-% of cholesterol, alone or in combination with other phospholipid-compatible steroids, may be employed in the present membranes. At these concentrations, for example, at about 0.1-1 mol-%, such steroids can exhibit a useful stabilizing effect, and exhibit a preference for the inner layer of the membrane.

BRIEF DESCRIPTION OF THE DRAWINGS

FIG. 1 graphically depicts the outside-to-inside ratio ($R_{o/i}$) of 1-palmitoyl lysophosphatidylcholine (lysoPC) versus the mol-% of lysoPC in POPC vesicles. The $R_{o/i}$ is determined by two methods, (1) from the integral values of the relevant $^{31}$P NMR peaks and (2) by actually cutting and weighing the respective peaks. The error between the two methods was ±5%. It can be seen from FIG. 1 that the $R_{o/i}$ value of lysoPC decreases sharply between about 5 and 10 mol-% of lysoPC and then approaches a value of about 5.3 for higher lysoPC concentrations. This indicates that increasing the mol-% of lysoPC decreases the asymmetric distribution of lysoPC over the two halves of the bilayer, and that lysoPC always shows a preference for the outer layer of the membrane.

As shown in FIG. 4, the amount of POPC hydrolyzed at 30 min. correlates very well with the ratio of lysoPC to POPC in the outer monolayer (FIG. 3)

DETAILED DESCRIPTION OF THE INVENTION

Membrane components of formulas I and II are formally derivates of glyceryl-3-phosphoryl choline, or "dilysophosphatidyl choline", which has been di-(1,2-) and mono(1-)acylated, respectively, with fatty acids, e.g., ($C_{10}$–$C_{30}$)alkyl-$CO_2H$. Compounds of formulas I and II are commercially available, e.g., from Sigma Chemical Co., St. Louis, MO and from Avanti Polar Lipids, Inc., Birmingham, AL. Commercially-available compounds of formula I include alpha-lecithin, 1-palmitoyl-2-oleoyl-phosphatidylcholine (PC); 1-stearoyl-2-arachidonoyl-PC; 1,2-diarachidoyl-PC; 1,2-dicaproyl-PC; 1,2-dielaidoyl-PC; 1,2,-diheptanoyl-PC; 1,2-dilauroyl-PC; 1,2-dilinoleoyl-PC; 1,2-dimyristoyl-PC; 1,2-dioleoyl-PC; 1,2-dipentadecanoyl-PC; 1,2-dipalmitoyl-PC; 1,2-distearoyl-PC; 1,2-diundecanoyl-PC; 1-palmitoyl-2-elaidoyl-PC; 1-palmitoyl-2-linoleoyl-PC; 1-stearoyl-2-oleoyl-PC; 1-oleoyl-2-palmitoyl-PC; 1-oleoyl-2-stearoyl-PC. ($C_{10}$–$C_{30}$)-fatty acid esters of glyceryl-3-phosphorylcholine wherein the fatty acids contain 1–2 triple bonds can also be used.

The corresponding compounds of formula II can be prepared from compounds of formula I by hydrolysis with phospholipase $A_2$, e.g., as disclosed by L. L. M. van Deenen and G. H. de Haas, *Biochim. Biophys. Acta*, 70, 538 (1963), the disclosure of which is incorporated by reference herein. Glyceryl-3-phosphocholine can also be selectively mono- or di-esterified by techniques well known in the art of organic synthesis. For example, see I. T. Harrison et al., *Compendium of Organic Synthetic Methods*, Wiley-Interscience, New York, NY (1971), at pages 280–286.

As described in detail hereinbelow, small unilamellar vesicle (SUV) liposomes (250–300 Å O.D.) can be prepared by dispersing films comprising phospholipids of formulas I and II in water or aqueous buffer, by sonication of the mixture to equilibrium under an inert atmosphere at about 1°–5° C. In a preferred embodiment, the lipid dispersion is sonicated for about 20 min. to 2.0 hours under nitrogen with a Branson tip sonicator model 350, at a power setting of 4. It will be appreciated that other sonication devices may be used to achieve similar results and that equilibrium may be reached in less than 20 min. at a higher power setting. Small unilamellar vesicles can also be prepared by extruding a lipid mixture through a micropore filter having a pore size of about 250–300 Å.

Larger liposomes can be prepared by extruding the lipid mixture through a larger micropore filter, e.g., of 500, 800 or 1000 Å. The optimal mol-% of lysophospholipid required in order to achieve total inhibition of $PLA_2$ hydrolysis of the membrane can be determined by empirical trials in accord with the detailed example described hereinbelow.

It has also been found that preferred amounts of lysophospholipid (II) act to physically stabilize SUVs, as well as to protect them against enzymatic degradation. These stabilizing effects appear to be due to the fact that the lysophospholipid molecule spacially occupies a "cone-shaped" space in the outer layer, thereby fulfilling the geometric packing requirements of highly curved vesicle surfaces. Thus, the lysophospholipid molecules strengthen the walls of SUVs which have highly curved membrane surfaces and act to relieve their internal stress. It is also believed that they make the surface impermeable to enzymes such as $PLA_2$ by blocking access to the C-2 carbon of the glycerol moiety.

When liposomes are sonicated until their constituents reach "equilibrium", they have reached a point of stable equilibrium of the mol-% ratios of LPL to PL in the outer layer of the membrane, and of LPL in the outer layer to LPL in the inner layer. When this equilibrium has been reached, optimum stability with respect to $PLA_2$-type hydrolysis is exhibited.

EXAMPLE

Small Unilamellar POPC/lysoPC Vesicles

A. Methods and Materials

1-Palmitoyl-2-oleoyl phosphatidylcholine (POPC) and 1-palmitoyl lysophosphatidylchloine (lysoPC) were obtained from Avanti Polar Lipids, Inc. (Birmingham, AL). $D_2O$ (99.8% D) and $CDCl_3$ (99.8% D) were obtained from KOR Isotopes (Cambridge, MA). Praseodymium chloride (99.9%) and calcium chloride were obtained from Aldrich Chemical Company (Milwaukee, WI). Snake venom phospholipase $A_2$ (*Ophiophagus hannah*) was obtained from Miami Serpentarium (Miami, FL) and was used as such.

A single spot on thin-layer chromatography confirmed that purity of POPC and lysoPC (developing solvent, chloroform/methanol/water, 65:35:8).

B. Preparation of SUV

Chloroform/methanol (1:1 v/v) solutions of the two lipids were mixed in a 25 ml round-bottomed flask. The solvents were removed on a rotary evaporator at 25° C. and the lipid film was thoroughly dried under vacuum for 6.0 hr at 25° C. The lipid film was dispersed in $D_2O$ to permit NMR observations, and vortexed for 20 min. The resulting lipid dispersion was sonicated under nitrogen with a Branson tip sonicator model 350, at a power setting of 4. Clearing was usually achieved within 30 min. The sonication vial was kept in an ice-water bath at 4° C. during sonication. Metal particles from the probe and any unbroken lipid aggregates were removed by high-speed ultracentrifugation for 1.0 hr. at 105,000×g on a Beckman model L5-75 ultracentrifuge. Inorganic phosphorus assay of the sediment after centrifugation, by the method of C. H. Fiske and Y. Subbarow, *J.B.C.*, 66, 375 (1925), showed less than 0.5% of phosphorus, indicating that all of the lipid had been converted into SUVs.

C. Characterization and Hydrolysis of SUV

The SUV prepared were characterized by negative staining electron microscopy. Sixty umoles of POPC and different amounts of lysoPC were present per 1 ml of vesicle solution. Vesicles were prepared with 2.5, 5, 10, 15, 17.5, 20 and and 25 mol-% of lysoPC.

$^{31}$P NMR spectra were recorded on a Varian FT 80A spectrometer, operating at 32.2 MHz for phosphorus. Eight hundred transients were collected for each sample using a sweep-width of 4 KHz with 8 K data points. All spectra were recorded under proton noise-decoupled conditions at 37° C.

Extra vesicular ionic concentrations of 6 mN $Ca^{2+}$ and 3 mM $Pr^{3+}$ were obtained by adding small volumes (~20 ul) of $D_2O$ stock solutions of the metal ions directly into the NMR tube. The required amount of phospholipase $A_2$ ($PLA_2$)(0.7 mg of protein/ml) was introduced into the NMR tubes by pipetting out small volumes of a $D_2O$ stock solution (about 7 ul) to the vesicular solutions already containing the required metal ions.

The hydrolysis of SUV was carried out in the NMR sample tube and was followed by $^{31}$P NMR. In a typical experiment, 1.5 of the vesicle solution was taken in the NMR tube and the required amounts of $Ca^{2+}$, $Pr^{3+}$ and $PLA_2$ were added. $^{31}$P NMR spectra were recorded at 30, 60, 90, etc. minutes after adding $PLA_2$. From the peak integral values, the amount of POPC hydrolyzed and the amount of lysoPC produced were calculated.

In another experiment, 3.0 ml of the vesicle solution with $Ca^{2+}$, $Pr^{3+}$, and $PLA_2$ were taken in a screw-cap bottle immersed in a water bath maintained at 37° C. (same temperature as that of the NMR prove). Two hundred ul of the vesicle solution was drawn out at 30, 60, 90, etc. minutes and the lipids were extracted by the method of E. G. Bligh and W. J. Dyer, *Canad. J. Biochem. Physiol.*, 37, 911 (1959). Organic and aqueous phases of the extraction were separately analyzed by thin-layer chromatography. The organic phase showed spots corresponding to POPC, lysoPC and fatty acids in the POPC system (developing solvent systems for POPC and lysoPC, chloroform/methanol/water, 65:35:8; and chloroform/diethyl ether/acetic acid, 70:30:2, for fatty acids).

The aqueous phase of the extraction was blown down under nitrogen and redissolved in a known volume of water. It was spotted on a thin-layer chromatography plate along with choline, phosphocholine and glycerophosphocholine standards. It was then developed in an n-propanol/aqueous ammonium hydroxide (1:1) solvent system. No spots corresponding to choline, phosphocholine, and glycerophosphocholine were observed in our samples. This demonstrated the fact that the $PLA_2$ did not contain any phospholipase C or phospholipase D.

All experiments reported here were repeated at least twice and the standard deviation from experiment to experiment was less than ±5%.

D. Results $^{31}$P NMR spectra of the POPC vesicles containing various mol-% of lysoPC, $Pr^{3+}$ (3mM), $Ca^{2+}$ (6 mM), and snake venom $PLA_2$ recorded at regular intervals indicate that the intensity of the lysoPC peak in the outer monolayer increases at the expense of outer monolayer POPC peak. The spectra also show a decrease in the intensity of the inner monolayer POPC peak without any change in its chemical shift value. This decrease is inversely proportional to the amount of lysoPC initially present in the vesicles. In other words, the decrease in the intensity of inner monolayer POPC peak is fast in vesicles containing low mol-% of lysoPC. This decrease also indicates a rapid flip-flop of POPC from the inner to the outer monolayer without causing any changes in the barrier properties of the vesicle.

The spectra also indicated that POPC vesicles containing 2.5 mol-% lysoPC became leaky after 1 hr. In contrast, vesicles containing 20–25 mol-% of lysoPC maintained an intact ion barrier beyond 4 days. The downfield movement of inner monolayer signals (towards the outer monolayer signals) is taken as a measure of the loss of the permeability barrier of the vesicles. The time at which the permeability barrier is lost is found to increase with increasing mol-% of lysoPC. Also, just before the collapse of the ion barrier in each case, a signal corresponding to lysoPC in the inner monolayer is detected which could be due to flip-flop of lysoPC from outer to inner monolayer, compensating the flip of POPC from inner to outer monolayer discussed above. As a result of this, increasing amounts of lysoPC are accumulated in the inner monolayer. Such a high accumulation of lysoPC in the inner monolayer could create some defective sites because of the cone shape of lysoPC. This leads to a diffusion of $Pr^{3+}$ ions to the intravesicular solution, resulting in a downfield shift of the inner monolayer peaks.

Figure 1:
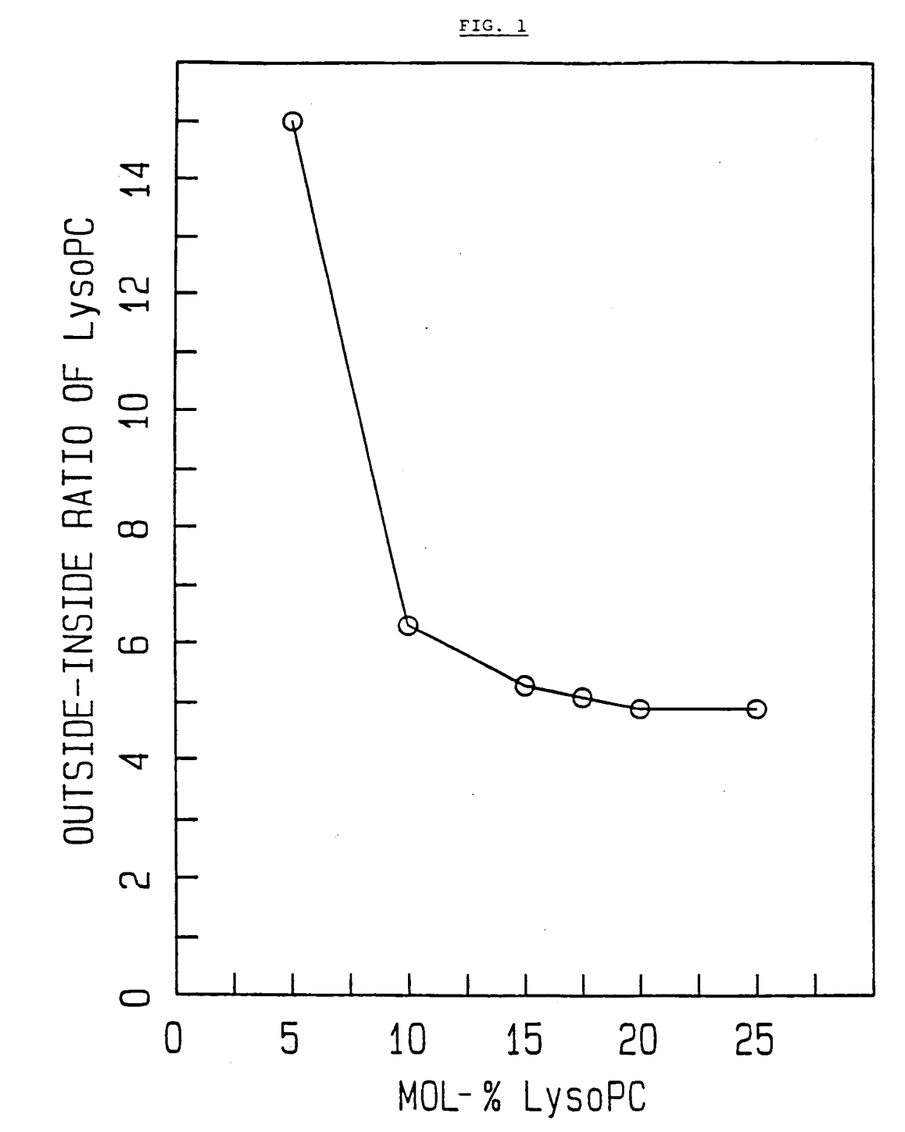

Surprisingly, a low mol-% of lysoPC (0–12.5 mol-%) stimulates, while a higher mol-% (20–25 mol-%) of lysoPC inhibits the $PLA_2$ hydrolysis of POPC vesicles. As shown in FIG. 1, the measured values of $R_{o/i}$ of lysoPC are 15 (at 5 mol-% lysoPC) and 5.3 (at 15 mol-% lysoPC). These correspond to 93% and 84% of lysoPC in the outer monolayer. This also indicates that a decrease in the asymmetry of lysoPC occurs when increasing mol-% of lysoPC is incorporated into the vesicles.

Figure 2:
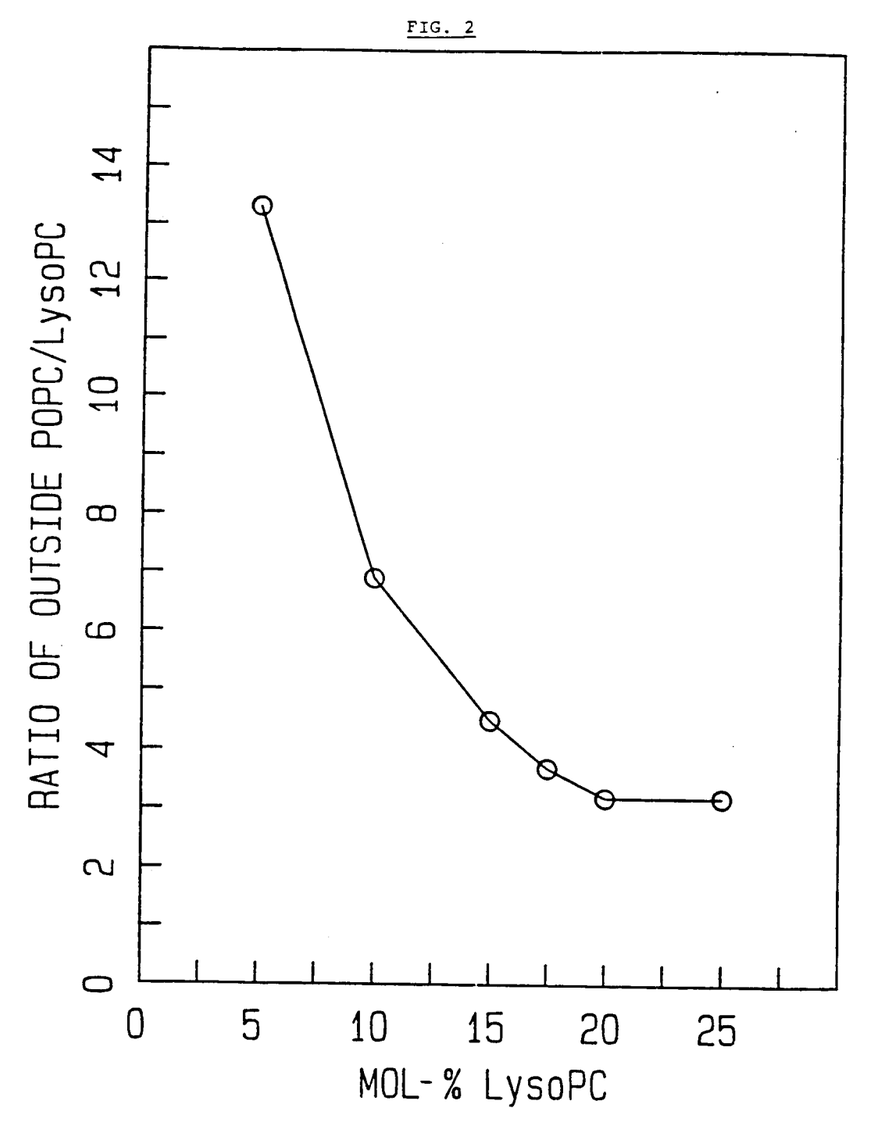
FIG. 2 graphically depicts the ratio of 1-palmitoyl-2-oleoyl-phosphatidylcholine (POPC) versus lysoPC on the outer monolayer. It can be observed from FIG. 2 that this ratio falls off sharply with increasing mol-% of lysoPC and finally remains constant between 20–25 mol-% lysoPC.
Figure 3:
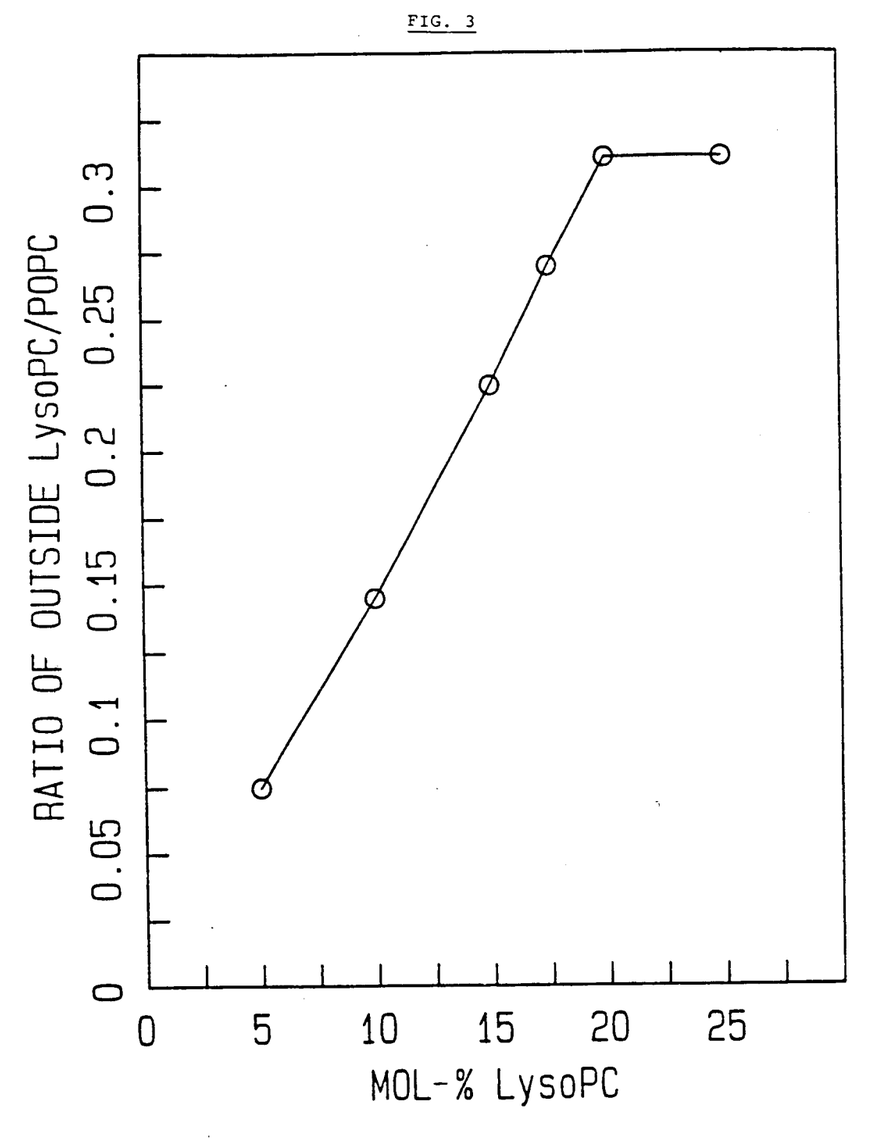
FIG. 3 graphically depicts the ratio of lysoPC/POPC in the outer monolayer versus the mol-% of lysoPC.

FIG. 2 demonstrates that the ratio of POPC/lysoPC in the outer monolayer also decreases with increasing mol-% of lysoPC. If the asymmetric distribution (with a higher number of lysoPC molecules in the outer monolayer) of lysoPC decreases with increasing mol-% of lysoPC (as discussed above and shown in FIG. 1), the decreased number of lysoPC molecules in the outer monolayer should manifest itself as a decrease in the ratio of POPC/lysoPC in the outer monolayer. FIG. 3 depicts a plot of the lyso/POPC ratio in the outer monolayer.

Figure 4:
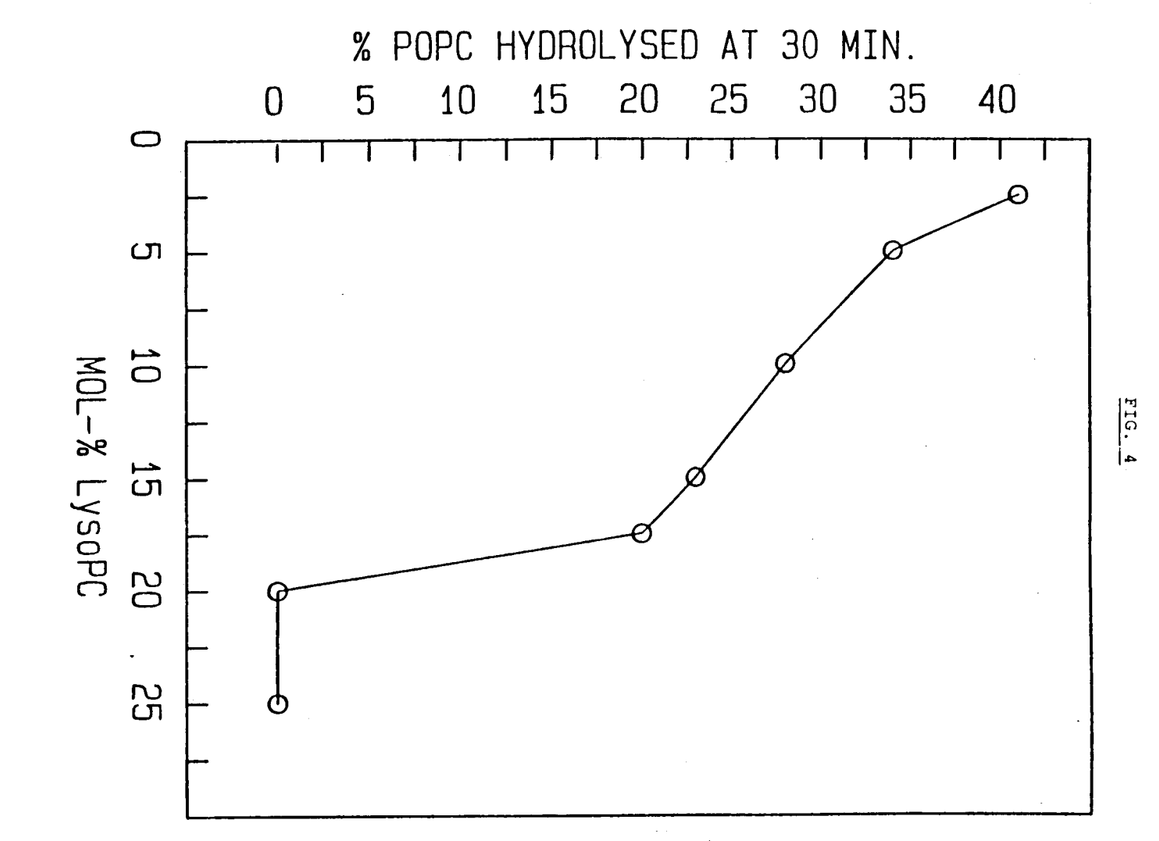
FIG. 4 graphically depicts the amount of POPC hydrolyzed in the first 30 min. versus the mol-% of lysoPC originally present in the POPC/lysoPC vesicles. The amount of POPC hydrolyzed at 30 min. is calculated from the difference in NMR peak integral values between 0 to 30 min.

FIG. 4 is a plot of the amount of POPC hydrolyzed by $PLA_2$ in the first 30 min. in POPC vesicles containing various amounts of lysoPC. It can be seen that the amount of POPC hydrolyzed falls off linearly with increasing mol-% of lysoPC up to 17.5 mol-% lysoPC and that no hydrolysis takes place between 20-25 mol-% lysoPC. In pure POPC vesicles (containing no lysoPC initially), about 25% of outer monolayer POPC is hydrolyzed in the first 30 min. In FIG. 4, this value would correspond to a lysoPC content of about 12.5 mol-%. Hence, it is believed that lysoPC up to 1.25 mol-% (in POPC vesicles) stimulates $PLA_2$ activity whereas lysoPC above 12.5 mol-% inhibits $PLA_2$ activity and the inhibition is virtually 100% above about 20 mol-% lysoPC.

The asymmetric distribution of lysoPC (in POPC vesicles) is very high, particularly at low mol-% of lysoPC (see FIG. 1). In other words, most of the total lysoPC is accommodated in the outer monolayer (particularly at 2.5 and 5 mol-% of lysoPC). A much higher concentration of lysoPC in the outer monolayer may create some organizational defects that act as sites for incorporation of hydrolytic enzymes in the bilayer. With the decreasing asymmetry in the distribution of lysoPC, the concentration of total lysoPC in the outer monolayer decreases with a consequent decrease in the number of organizational defects. This, in turn, is reflected in the apparent inhibition of the enzyme activity by lysoPC at higher concentrations.

Finally, between 20-25 mol-% lysoPC, the head group packing in the outer monolayer is so tight that the enzyme cannot penetrate to the glycerol C-2 carbon to catalyze any hydrolysis. This corresponds to POPC-/lysoPC ratio of about 3.2 in the outer monolayer.

The invention has been described with reference to various specific and preferred embodiments and techniques. However, it should be understood that many variations and modifications may be made while remaining within the spirit and scope of the invention.

What is claimed is:

1. A method of stabilizing a liposome membrane comprising forming a unilamellar liposome having a single bilayer membrane having an outer layer and an inner layer including:

(a) between about 70-80 mol-% of a phospholipid (PL) of the formula:

(b) between about 20-30 mol-% of lysophospholipid (LPL) of the formula:

wherein $R_1$, $R_2$, and $R_3$ are individually $(C_{10}-C_{30})$alkanoyloxy groups including from about 0-4 double bonds, and wherein at least one of $R_1$, $R_2$, and $R_3$ include at least one double bond; by combining (a) and (b) so that the ratio of LPL to PL in the outer layer is about 0.275-0.35:1.0.

2. The method of claim 1 wherein the ratio of PL to LPL in the bilayer membrane is about 3-4:1.

3. The method of claim 1 wherein $R_1$, $R_2$, and $R_3$ are individually oleoyl, palmitoyl, stearoyl or myristoyl.

4. The method of claim 3 wherein $R_1$ and $R_3$ are palmitoyl and $R_2$ is oleoyl.

5. A stable liposome made by the process of claim 1.

6. A method of stabilizing a liposome membrane comprising forming a unilamellar liposome having a single bilayer membrane having an outer layer and an inner layer including:

(a) between about 70-80 mol-% of a phospholipid (PL) of the formula:

(b) between about 20-30 mol-% of a lysophospholipid (LPL) of the formula:

wherein $R_1$, $R_2$, and $R_3$ are individually $(C_{10}-C_{30})$ alkanoyloxy groups including from about 0-4 double bonds, and wherein at least one of $R_1$, $R_2$, and $R_3$ include at least one double bond; by sonicating a mixture of (a) and (b) in water for a period of time effective to equilibrate (a) and (b) in the bilayer membrane so that the ratio of LPL to PL in the outer layer is about 0.275-0.35:1.0.

7. The method of claim 6 wherein the ratio of PL to LPL in the bilayer membrane is about 3-4:1.

8. The method of claim 6 wherein $R_1$, $R_2$ and $R_3$ are individually oleoyl, palmitoyl, stearoyl or myristoyl.

9. The method of claim 8, wherein $R_1$ and $R_3$ are palmitoyl and $R_2$ is oleoyl.

10. A stable liposome having a single bilayer membrane including inner and outer layers, said liposome being made according to a process comprising the steps of:

(a) mixing (i) between about 70-80 mol-% of a phospholipid (PL) of the formula and (ii) between about 20-30 mol-% of a lysophospholipid (LPL) of the formula:

wherein $R_1$, $R_2$, and $R_3$ are individually $(C_{10}-C_{30})$ alkanoyloxy groups including from about 0-4 double bonds; wherein at least one of $R_1$, $R_2$, and $R_3$ include at least one double bond;

(b) dispersing the mixture in an aqueous medium; and (c) sonicating the dispersion for a period of time effective to equilibrate (i) and (ii) within the bilayer membrane.

11. The liposome of claim 10 wherein the step of mixing includes: mixing (i) and (ii) together in a volatile solvent effective to mix (i) and (ii); and removing the solvent by an evaporatory process.

* * * * *

UNITED STATES PATENT AND TRADEMARK OFFICE
CERTIFICATE OF CORRECTION

PATENT NO. : 5,009,956

DATED : April 23, 1991

INVENTOR(S) : Wolfgang J. Baumann et al.

It is certified that error appears in the above-identified patent and that said Letters Patent is hereby corrected as shown below:

On title page, Item: [75] Inventor:, add the name of Kumar Vedantam, Austin, Minn.

column 1, line 22, for "drugs" read --drug-- column 1, line 25, for "Banghan" read --Bangham-- column 1, line 55, for "amphiphatic" read --amphipathic-- column 2, line 37, for "cleave" read --cleavage-- column 4, line 28, for the second "to" read --of-- column 6, line 17, for "surface" read --surfaces-- column 7, line 9, for "mN" read --mM-- column 7, line 20, after "1.5" insert --ml-- column 7, line 29, for "prove" read --probe-- column 8, line 55, for "1.25" read --12.5--

UNITED STATES PATENT AND TRADEMARK OFFICE
CERTIFICATE OF CORRECTION

PATENT NO. : 5,009,956
DATED : April 23, 1991
INVENTOR(S) : Wolfgang J. Baumann et al.

It is certified that error appears in the above-identified patent and that said Letters Patent is hereby corrected as shown below:

column 10, line 27, delete "," after --8-- column 10, line 34, after "formula" insert --:--

Signed and Sealed this

Eighth Day of February, 1994

Attest:

BRUCE LEHMAN

Attesting Officer   Commissioner of Patents and Trademarks